(12) United States Patent
Mukraj et al.

(10) Patent No.: US 7,894,370 B2
(45) Date of Patent: Feb. 22, 2011

(54) MEDIA CONTENT DISTRIBUTION SYSTEM AND METHOD

(75) Inventors: Rab Mukraj, Scarsdale, NY (US); Jonathan Hodges, New York, NY (US); Nader Kazemi, North Hollywood, CA (US); Sumit Mathur, Fords, NJ (US); Darren Tome, Long Island City, NY (US)

(73) Assignee: NBC Universal, Inc., New York, NY (US)

( * ) Notice: Subject to any disclaimer, the term of this patent is extended or adjusted under 35 U.S.C. 154(b) by 512 days.

(21) Appl. No.: 11/716,479

(22) Filed: Mar. 9, 2007

(65) Prior Publication Data

US 2008/0222684 A1    Sep. 11, 2008

(51) Int. Cl.
*H04L 12/24* (2006.01)
(52) U.S. Cl. .......................... 370/254; 709/227
(58) Field of Classification Search ................ 370/351, 370/238, 254; 709/227
See application file for complete search history.

(56) References Cited

U.S. PATENT DOCUMENTS

| 6,314,093 | B1* | 11/2001 | Mann et al. ................ 370/351 |
| 6,925,504 | B1 | 8/2005 | Liskov et al. |
| 2001/0002193 | A1* | 5/2001 | Fourie et al. ............... 370/360 |
| 2003/0103077 | A1* | 6/2003 | Despotidis et al. .......... 345/734 |
| 2004/0167981 | A1 | 8/2004 | Douglas et al. |
| 2005/0114285 | A1* | 5/2005 | Cincotta ..................... 707/1 |
| 2005/0240550 | A1 | 10/2005 | Armes et al. |
| 2005/0262247 | A1* | 11/2005 | Whitehead ................. 709/227 |

FOREIGN PATENT DOCUMENTS

WO    WO 2004045189    5/2004

\* cited by examiner

*Primary Examiner*—Melvin Marcelo
(74) *Attorney, Agent, or Firm*—Fletcher Yoder

(57) ABSTRACT

A system and method for transfer of digital content, including providing a listing of sources and content destinations, receiving a user selection of a content source and a destination from the source and destination listing, providing a listing of available paths for the exchange of digital content, receiving a user selection of a routing path from the routing path listing, and permitting transmission of the content from the selected source to the destination via the selected routing path.

21 Claims, 13 Drawing Sheets

SITE MANAGEMENT

AVAILABLE SITES

| | ORGANIZATION | SITE NAME | EDIT | DELETE |
|---|---|---|---|---|
| 🖧 | ORGANIZATION 1 | SITE 1 | ✎ | 🗑 |
| 🖧 | ORGANIZATION 2 | SITE 1 | ✎ | 🗑 |
| 🖧 | ORGANIZATION 2 | SITE 2 | ✎ | 🗑 |
| 🖧 | ORGANIZATION 3 | SITE 3 | ✎ | 🗑 |

4 ITEMS FOUND, DISPLAYING ALL ITEMS

[CREATE NEW SITE] — 166

EDIT SITE

SITE DETAIL                                           *REQUIRED FIELDS

- SITE NAME*
- SITE DESCRIPTION*
- ADDRESS*
- PHONE
- FAX
- CITY*
- STATE*
- ZIP*
- COUNTRY*
- CONNECTION SPEED*
- AVAILABLE BANDWIDTH*
- CONCURRENT JOBS*
- MINIMUM BANDWIDTH* MBPS
- ORGANIZATION TYPE*  INTERNAL ☐  EXTERNAL ☒
- DMZ*
- ORGANIZATION*
- GROUPS*    [ADD>>] — 174

| GROUP | PATH | PATH TYPE | REMOVE | SETUP |
|---|---|---|---|---|
| GROUP 1 | C:\ | WINDOWS | 🗑 | NO |

SITE OWNERS

USER [       ]    SEARCH BY: [LAST NAME ▼] [SEARCH...] — 176

SEARCH RESULTS          SITE OWNER LIST

| LAST NAME | FIRST NAME | REMOVE |
|---|---|---|
| MUKRAJ | RAB | 🗑 |
| HODGES | JONATHAN | 🗑 |
| KAZEMI | NADER | 🗑 |
| MATHUR | SUMIT | 🗑 |

NOTHING FOUND TO DISPLAY

AVAILABLE AGENTS

| AGENT NAME | AGENT | OS | REGISTERED |
|---|---|---|---|
| AGENT 1 | AGENT1.XXXX.COM | WINDOWS | ✓ |
| AGENT 2 | AGENT2.XXXX.COM | WINDOWS | ✗ |

2 ITEMS FOUND, DISPLAYING ALL ITEMS

[CANCEL] [SAVE] — 172

FIG. 8

MEDIA CONTENT DISTRIBUTION SYSTEM AND METHOD

BACKGROUND

The present invention relates generally to the field of file transfer management systems, and more particularly to a media content distribution technique that allows for establishing relations and control of file transfer between internal and external sources and destinations.

Many systems have been developed and are currently in use for exchanging digital content, such as movies, music, videos, and so forth. However, for relatively large files, such as with certain audio/video files and other files, the rate and control of the file transfer may be problematic. For example, the transfer rate may be low relative to the size of the audio/video file. In such a scenario, the electronic transfer of the audio/video file may last for days. Thus, to avoid delay, the audio/video file(s) may instead be transported from a source to a destination by vehicle (e.g., airplane). However, vehicular transport can be costly and inconsistent. Moreover, the ease of establishing and controlling the electronic transfer of electronic files between a variety of sources and destinations can be awkward and challenging. Indeed, the transfer of electronic files (e.g., audio/video files, text files, etc.) can be demanding due to accommodating corporate firewalls and providing secure channels, for example.

There is a significant need in the field, therefore, for improvements in electronic file transfer technologies. In particular, there is a need for a technique that facilitates the establishment and control of file transfers. There is a need for a technique that improves the ease and rate of the electronic transfer of files including relatively large audio/video files.

BRIEF DESCRIPTION

The present technique provides a media content distribution method and system designed to respond to such needs. The present technique may be used with a wide range of media, content, and in various devices. In general, the technique is well-suited to transfer of such content as movies, music, videos, and so forth internally and externally over the Internet. The invention provides for the establishing of relations between content sources and content destinations, as well as the monitoring and control of file transfers between a variety of sources and destinations both external and internal to the entity managing a media content distribution system (MCDS).

In accordance with one aspect of the invention, a method for transfer of digital content includes: providing a listing of content sources and content destinations; receiving a user selection of a content source and a content destination from the source and destination listing; providing a listing of available routing paths for the exchange of digital content between the source and destination; receiving a user selection of a routing path from the routing path listing; and permitting transmission of the content from the selected source to the selected destination via the selected routing path.

In accordance with another aspect of the invention, a method for transfer of digital content includes: receiving a user selection of a content source and a content destination from a source and destination listing provided by a content exchange control entity; receiving a user selection of a routing path from a listing of available routing paths for the exchange of digital content between the source and destination provided by a content exchange control entity; and permitting transmission of the content from the selected source to the selected destination via the selected routing path, wherein the selected source and the selected destination are external to the content exchange control entity.

In accordance with yet another aspect of the invention, an interface for controlling transfer of digital content includes: a listing of content sources and content destinations, the source and destination listing permitting user selection of a content source and a content destination for transfer of digital content; a listing of available routing paths for the exchange of digital content between the source and destination, the routing path listing permitting user selection of a routing path for the transfer of the content from the selected source to the selected destination via the selected routing path.

In accordance with yet another aspect of the invention, a system for transfer of digital content includes: means for providing a listing of content sources and content destinations; means for receiving a user selection of a content source and a content destination from the source and destination listing; means for providing a listing of available routing paths for the exchange of digital content between the source and destination; means for receiving a user selection of a routing path from the routing path listing; and means for permitting transmission of the content from the selected source to the selected destination via the selected routing path.

DRAWINGS

These and other features, aspects, and advantages of the present invention will become better understood when the following detailed description is read with reference to the accompanying drawings in which like characters represent like parts throughout the drawings, wherein:

FIG. 8 is a diagrammatical representation of a site management screen of a MCDS interface in accordance with aspects of the present invention;

DETAILED DESCRIPTION

The present technique provides for media content distribution including establishing relations between one or more content sources and one or more content destinations. Content sources and the content destinations may be external to an entity (e.g., a content exchange control entity) that establishes the relation. The entity may include a transfer agent configured to permit transfer of content. In certain embodiments, the technique permits transmission (e.g., via the transfer agent) of the content from the source (e.g., a source group) to the destination (e.g., a destination group) only if the relation exists (e.g., in a MCDS) between the source and the destination. In certain embodiments, both the content source and the content destination are external to the entity that establishes the relation, and the content is not transferred through the entity that establishes the relation.

Moreover, the present technique may provide for monitoring and logging transfers between the source and the destination, e.g. via the transfer agent. An agent may be configured at the source to trust an agent at the destination and at an entity that establishes the relation. It should be noted that the system may permit exchange of content via a transfer manager that employs a UDP protocol. In addition, the established relation may permit a client to browse content stored at a source under the control of the entity that establishes the relation. Further, the content exchange control entity that permits configuration of the relations may generally have a one or more interfaces. An administrator user interface may facilitate defining relations and establishing permissions to transfer content from specified content sources to specified content destinations. Such permission may be under the control of the content exchange control entity within a media content distribution system (MCDS) at which the administrator user interface is provided. Content sources and the content destinations may be external to the content exchange control entity.

Figure 1:
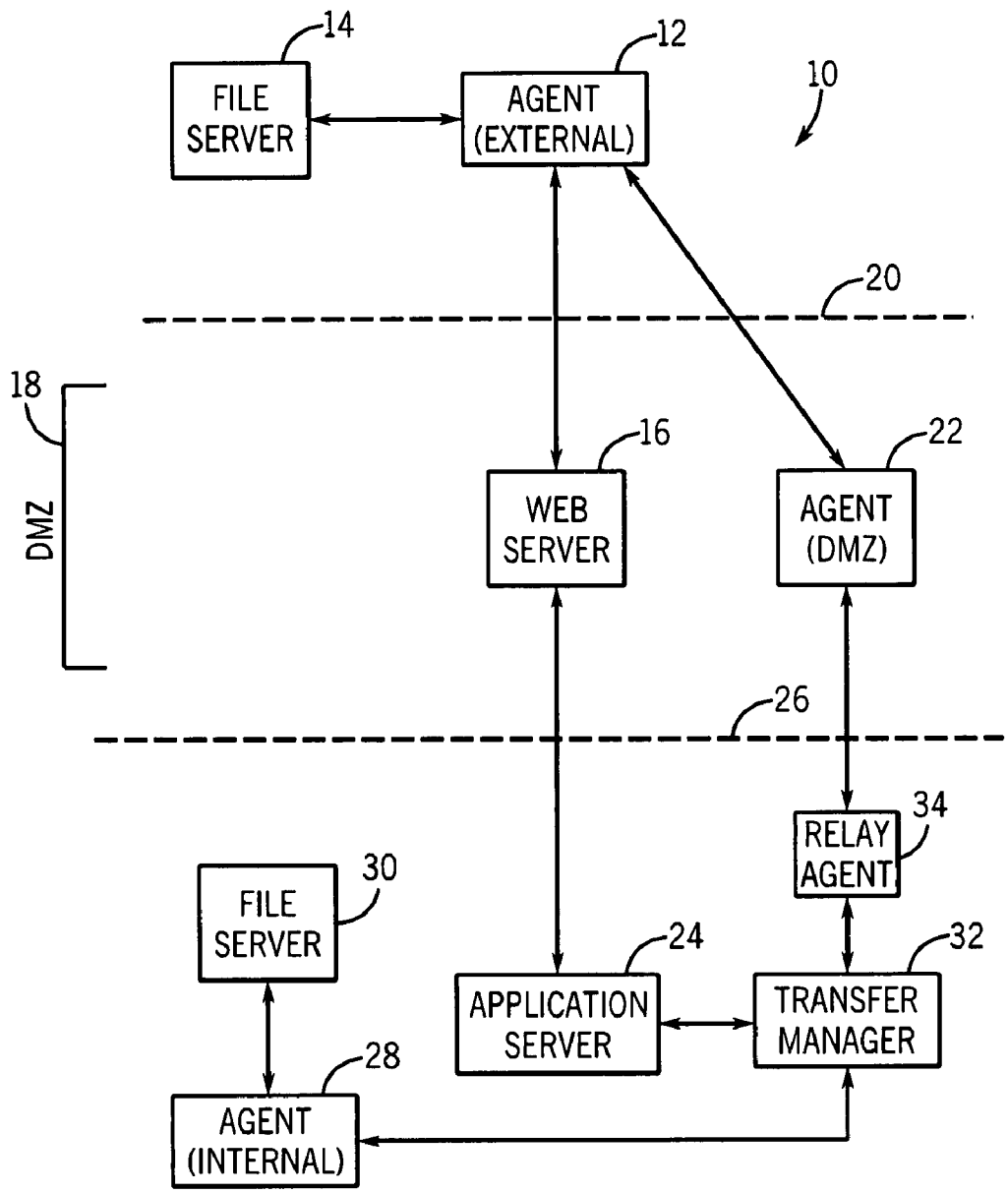
FIG. 1 is a block diagram of a media content distribution system (MCDS) in accordance with aspects of the present invention.

Turning now to the drawings, depicts FIG. 1, a media content distribution system 10 for delivering electronic files to users and associated user devices (e.g., an agent 12). The files may consist of any form of digital data, particularly films, music, videos, and so forth. In the schemes outlined in the present discussion, however, the number of files or types of content is not intended to be limited in any way. The users or devices described below may include individuals, businesses, commercial establishments, and a host of combinations of these. In general, the devices to which the content is provided may, in accordance with present technologies, include computers such as personal computers, laptops, and so forth. More generally, however, the devices may include both stationary and portable devices, media centers, and so forth.

Throughout the present discussion, reference will be made to organizations, groups, and sites associated with content sources and content destinations. As those skilled in the art will recognize, in the entertainment industry, certain entities will generally generate, create, or receive content, while these or other entities will distribute, sell, or otherwise provide the content to users. However, in the present context, any or even all of these should be understood as included under the umbrella term organization, group, or site. That is, they may be any person or entity that transmits or receives files or content. It is not necessary for a content source to have generated such content, nor that the content source owns the intellectual property rights relating to such content.

The actual components and systems used by a content source or a content destination in the techniques described below may be physically disposed in a central location, but may more typically be distributed. That is, the source will typically use a number of storage devices, servers, communications devices and so forth which will be connected by a network on the content provider side. The network may include any range of network media and protocols, including conventional telephony connections, Internet connections, cabled and wireless connections, satellite connections, and so forth. Moreover, the content and data for provision of the content and regulation of its use may be communicated in accordance with any suitable protocol, such as the conventional TCP/IP protocol used for Internet communications.

In FIG. 1, the media content distribution system 10 incorporates or is coupled to an external agent 12 having a file server 14. In certain embodiments, the external agent 12 may communicate with a web server 16 disposed in a DMZ 18, i.e., a "demilitarized zone." As discussed below, such a communication may occur when the external agent 12 is being installed as part of the MCDS 10. The external agent 12 may more typically communicate with a DMZ agent 22, such as during file transfer operations.

A "demilitarized zone" is a term employed in the art of networking environments. The DMZ 18 is an interface between external components and internal components and users. In computer security, a DMZ or perimeter network may be a network area (a subnetwork) that sits between an organization's internal network and an external network. In certain examples, connections from the internal network and the external network to the DMZ are permitted, whereas connections from the DMZ may only be permitted to the external network and hosts in the DMZ may only connect to specific hosts within the internal network. This allows the DMZ's hosts to provide services to the external network while protecting the internal network in case intruders compromise a host in the DMZ. Connections from the external network to the DMZ may be controlled using port address translation (PAT), for example.

A DMZ may be created through a configuration option on the firewall, where each network is connected to a different port on the firewall, which may be called a three-legged firewall set-up. A typically stronger approach is to employ two firewalls, where the DMZ is in the middle and connected to both firewalls, and one firewall is connected to the internal network and the other to the external network. This helps prevent accidental misconfiguration, for example, and allows access from the external network to the internal network (e.g., a screened-subnet firewall).

In the example of FIG. 1, the external agent 12 communicates with the web server 16 in the DMZ 18 through a firewall 20. However, as mentioned, in certain embodiments, an external agent 12 will not communicate with the web server 16, but instead communicates through a DMZ agent 22. One or more DMZ agents 22 may be situated in the DMZ 18. An application server 24 (an internal component) is coupled with the web server 16 in the DMZ 18 across a firewall 26. The DMZ agent 22, application server 24, and an internal agent 28 having a file server 30 are coupled with a transfer manager 32 (an internal component). The DMZ agent 22 is coupled with the transfer manager 32 via relay agent 34. The transfer manager 32 may include a variety of hardware and software employed to centralize the management and routing of file transfers amongst the various agents (both internal and external).

External agents 12 will generally communicate through a DMZ agent 22 and relay agent 34 to the transfer manager 32. However, in the illustrated embodiment of FIG. 1, the external agent 12 is being installed in the MCDS 10, and an install request is being sent to the application server 24 via the external agent 12 and web server 16. Such a request may be commenced, for example, with a remote login program via an internal user or client having access to a browser. This may be the case, for example, where the agent 12 is a headless server. To remotely start the install request of the external agent 12, files may be copied to the agent 12 via the remote client or user (e.g., having a browser). Then, the files are executed by the agent 12 to initiate its install request to the application server 24 via the web server 16. Again, however, in the typical file transfer, most or all agents will generally communicate with the transfer manager 32 (e.g., such as the external agent 12 communicating via the DMZ agent 22 and relay agent 34 to the transfer manager 32).

In general, content may be deployed from internal sites to external sites through the DMZ 18. In certain embodiments, as discussed below, a first job transfers content from the internal agent (on a network or site) to the DMZ 18, and a second job transfers the content from the DMZ 18 to the external agent (on a network or site). There may be multiple DMZ's 18 in the environment of the internal system. The system 10 may optimize the selection of the most appropriate DMZ 18 to deploy content. During the creation of an internal group or internal site, the system 10 may prompt the group or site owner to select the DMZ 18 information.

In operation of system 10, an agent 12 may be installed. As discussed, prior to installation, the agent 12 (e.g., via an internal user) may send an install request through the web server 16 to the application server 24. The request is then routed to the transfer manager 32 from the application server 24. The transfer manager 32 may then check the agent identification and validate the status of the agent 12. A trusted certificate, for example, may then be routed to the application server 24. The trusted certificate and an associated successful status message may then be forwarded from the application server 24 through the web server 16 to the agent 12. Thus, the system 10 may provide for a certificate process to validate and add an agent 12 to the system 10.

Figure 2:
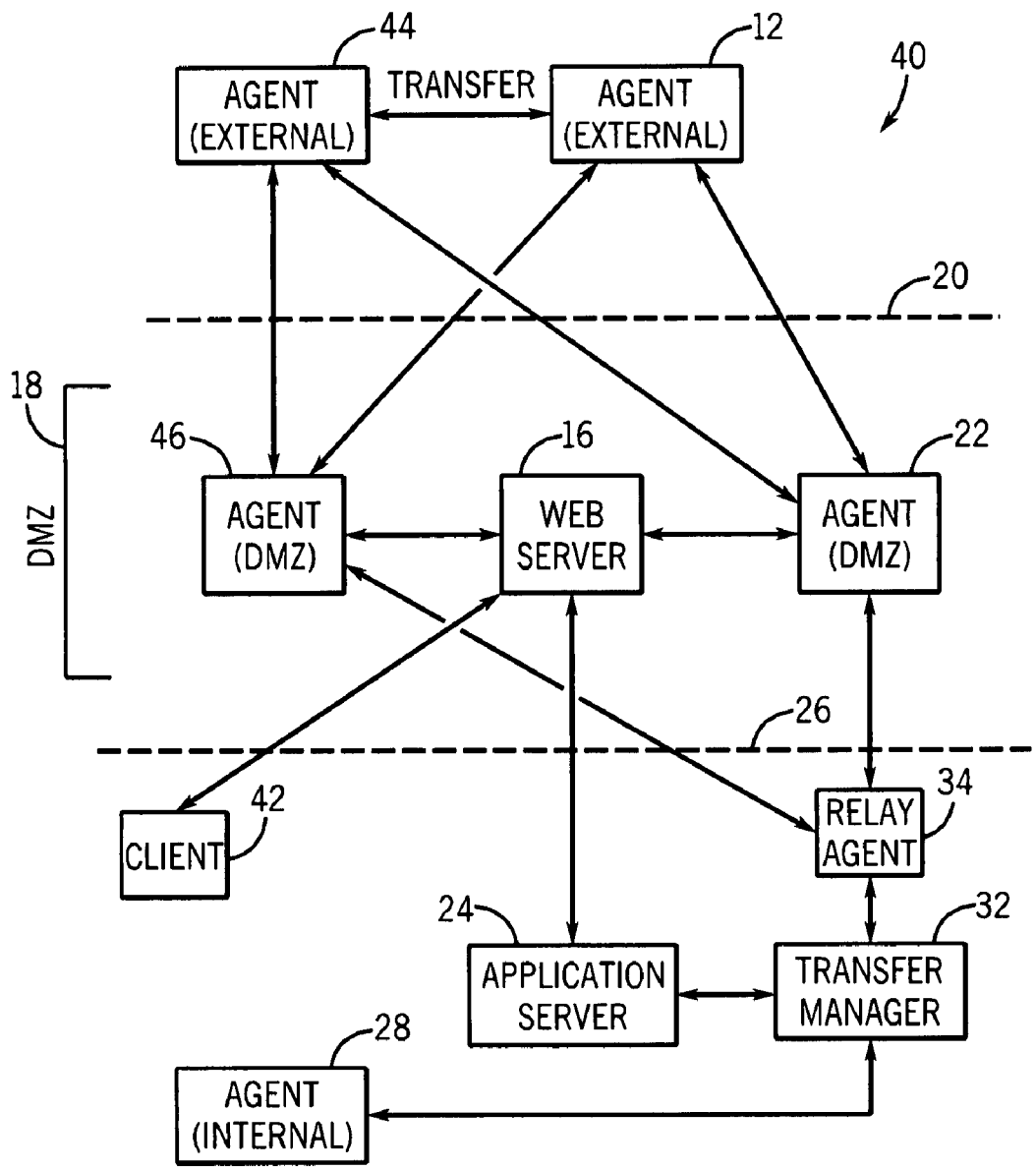
FIG. 2 is a block diagram of a MCDS in accordance with aspects of the present invention.

FIG. 2 depicts a media content distribution system 40 having the external agent 12, web server 16, application server 24, DMZ agents 22, internal agent 28 and transfer manager 32. In addition, the system 40 is coupled with a client 42 and a second external agent 44. The DMZ 18 includes a second DMZ agent 46. Indeed, it should be noted that while only one or two DMZ agents are depicted in the present figures, a given DMZ will typically contain several agents. Such DMZ agents can be load balanced for file transfers through the DMZ. A MCDS may have multiple DMZ's, and, again, each DMZ may have multiple agents. Thus, during file transfers, for a selected or given DMZ, a MCDS (e.g., MCDS 40) may load balance between available DMZ agents within the selected DMZ.

Furthermore, the system 40 may also incorporate a relay agent 34 used to facilitate the transfer of information through the DMZ agent 22 and DMZ zone 18. The MCDS 40 may be employed to transfer files (e.g., text files, audio/video files, and so on) between external agents, between an internal agent and an external agent, and between internal agents. In this embodiment, the transfer management 32 (an internal component) may monitor and manage the transfer of files between the various agents, including a file transfer between external agents 12 and 44.

In an example of external-to-external file transfer, i.e. between external agent 44 and external agent 12, a client 42 may initiate a request for such a file transfer via the web server 16. Requests for the external-to-external file transfer between external agent 44 and external agent 12 is then routed to the application server 24 and to the transfer manager 32. The transfer manager 32 then initiates the file transfer through the relay agent 34 and the DMZ agent 22, and ultimately to the external agent 12. The file(s) are transferred from agent 12 to agent 44, and the connection is established between the two external agents 12 and 44. A transfer start/status may be forwarded from agent 12 through the DMZ Agent 22 to the relay agent 34 and the transfer manager 32. The job percent complete may be signaled from the transfer manager 32 to the application server 24. The current status of the file transfer may be indicated from the web server to the client 42.

In an example of an internal to external file transfer, i.e., from internal agent 28 to external agent 12, the file transfer may occur in two jobs. It should be a special connection may be implemented between the relay agent 34 and a DMZ agent 22. However, the relay agent 34 may act as a gateway server to the DMZ 18. In the transfer of a file, such as an audio/video file, from internal agent 28 to an external agent 12, the file transfer may be initiated by client 42 via the web server 16. The request is routed to the application server 24 which initiates a first job to the transfer manager 32. The first job provides for a transfer between internal agent 24 and the DMZ agent 22 via the transfer manager 32. The transfer manager 32 communicates with the internal agent 28 to commence the transfer from internal agent 28 to the DMZ agent 22 via the relay agent 34. A transfer start/status may be routed from the DMZ agent 22 through the relay agent 34 back to agent 28 and transfer manager 32. The transfer manager 32 may then provide the application server 24 with a transfer status of the run percent completion. In this example, at the completion of the first job (i.e., the transfer of the file from agent 24 to the DMZ agent 22), the percent complete is 50% of the overall transfer.

In certain embodiments, logic at the end point of the first job may prompt the application server 24 and/or transfer manager 32 to initiate the second transfer job from the DMZ agent 22 to the external agent 12. In this example, the transfer manager 32 kicks-off the second job, i.e., instructing the application server 24 to initiate the second job (from the DMZ Agent 22 to the external agent 12). The second job request is then routed from the application server 24 through the transfer manager 32 to the relay agent 34 and DMZ agent 22. The file transfer occurs from the DMZ agent 22 to the external agent 12. A signal indicative that the connection has been established and that the second transfer has started may be routed from the external agent 12 back to the application server 24 via the DMZ agent 22, then to the relay agent 34 and transfer manager 32. At the completion of the second job the percent complete of the overall transfer may be noted as 100%.

It should be noted that a DMZ routing UDP relay may be implemented such that a single job may accomplish the file transfer. For example, in certain embodiments, during an MCDS transfer that is either from an internal client to an external client or external client to internal client, MCDS will use the DMZ agent as a relay to reach the external point or internal point and therefore only need one job. The transfer may accomplished, for example, by:

```
Internal Agent ->Internal Relay Agent -> DMZ Relay Agent ->
External Agent
or
External Agent -> DMZ Relay Agent -> Internal Relay Agent ->
Internal Agent.
```

Figure 3:
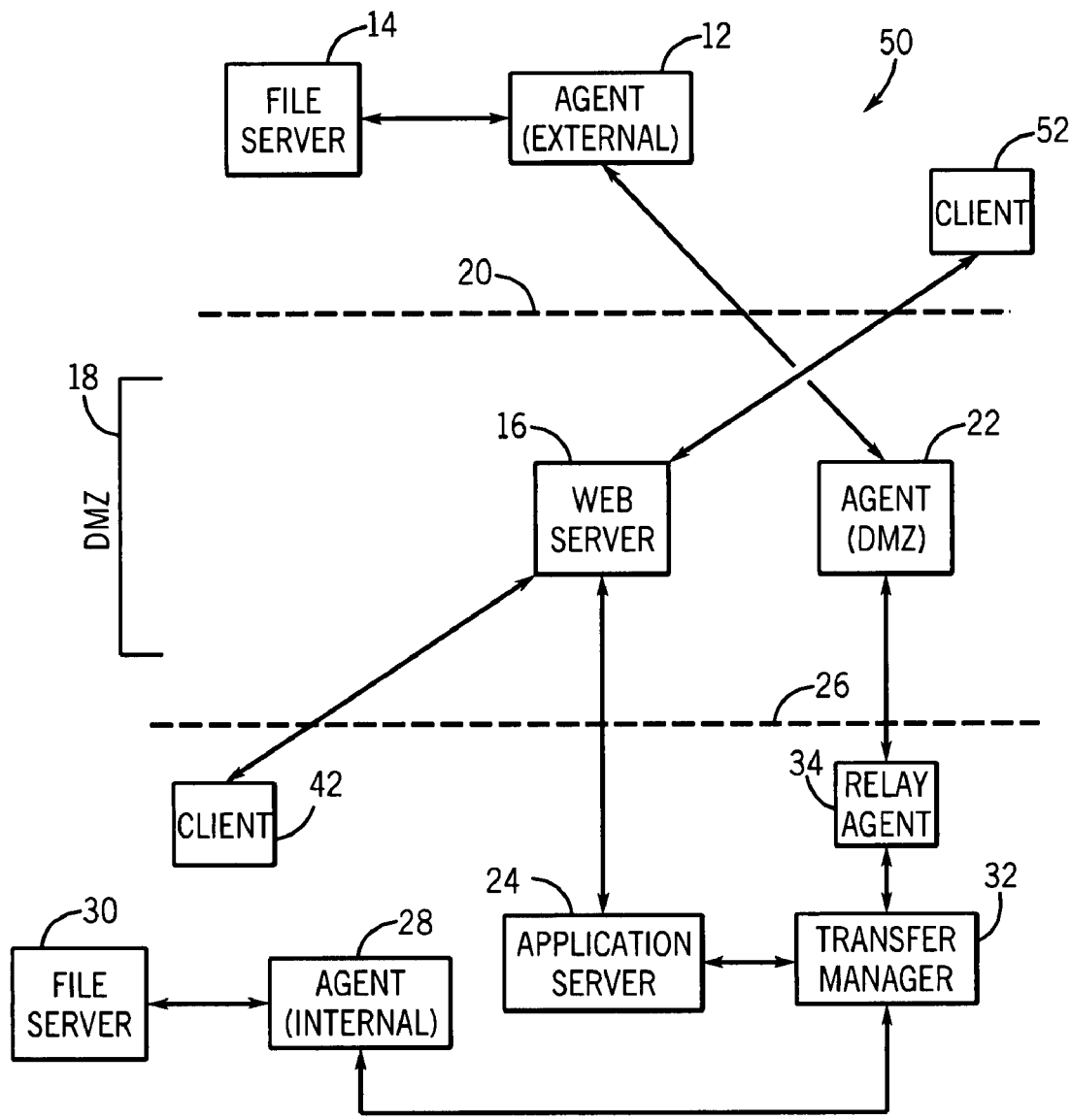
FIG. 3 is a block diagram of a MCDS in accordance with aspects of the present invention.

FIG. 3 depicts a media content distribution system 50 incorporating features of systems 10 and 40 of FIGS. 1 and 2, respectively. In system 50, an external agent (e.g., agent 12) may browse an internal agent (e.g., agent 32). In this example, an external client 52 may initiate a browse request of the site where internal agent 32 resides. The request(s) may be routed through the web server 16 to the application server 24 and to the transfer manager 32. Such a request may be load balanced to optimize the selection of the many agents that may reside at a given site.

In this example of an external client browsing an internal agent or associated file server, the transfer manager 32 may provide a directory listing to the browser at client 52. The transfer manager sends a browse request for a specific path to internal agent 28, and the request is then routed to the file server 30 associated with internal agent 28. The file server 30 provides a directory listing through the internal agent 28 and to the transfer manager 32. The directory listing is then routed from the transfer manager 32 through the application server 24 and web server 16 to the client 52. It should be noted that in this example, a relay agent 34 is not employed.

An example of an internal client browsing an external agent is client 42 browsing external agent 12 or associated file server. The client 42 may initiate such a browse via web server 16. The request is sent from the web server 16 through the application server 24 and transfer manager 32 to the relay agent 34. A site path of the file server is passed from the transfer manager 32 through the relay agent 34 and DMZ agent 22 to the external agent 12. A directory listing is provided from the external agent 12 (and associated file server 14) back to the DMZ agent 22, relay agent 34, transfer manager 32, and application server 24. The directory listing is then ultimately routed through the web server 16 to the browser at internal client 42.

Figure 4:
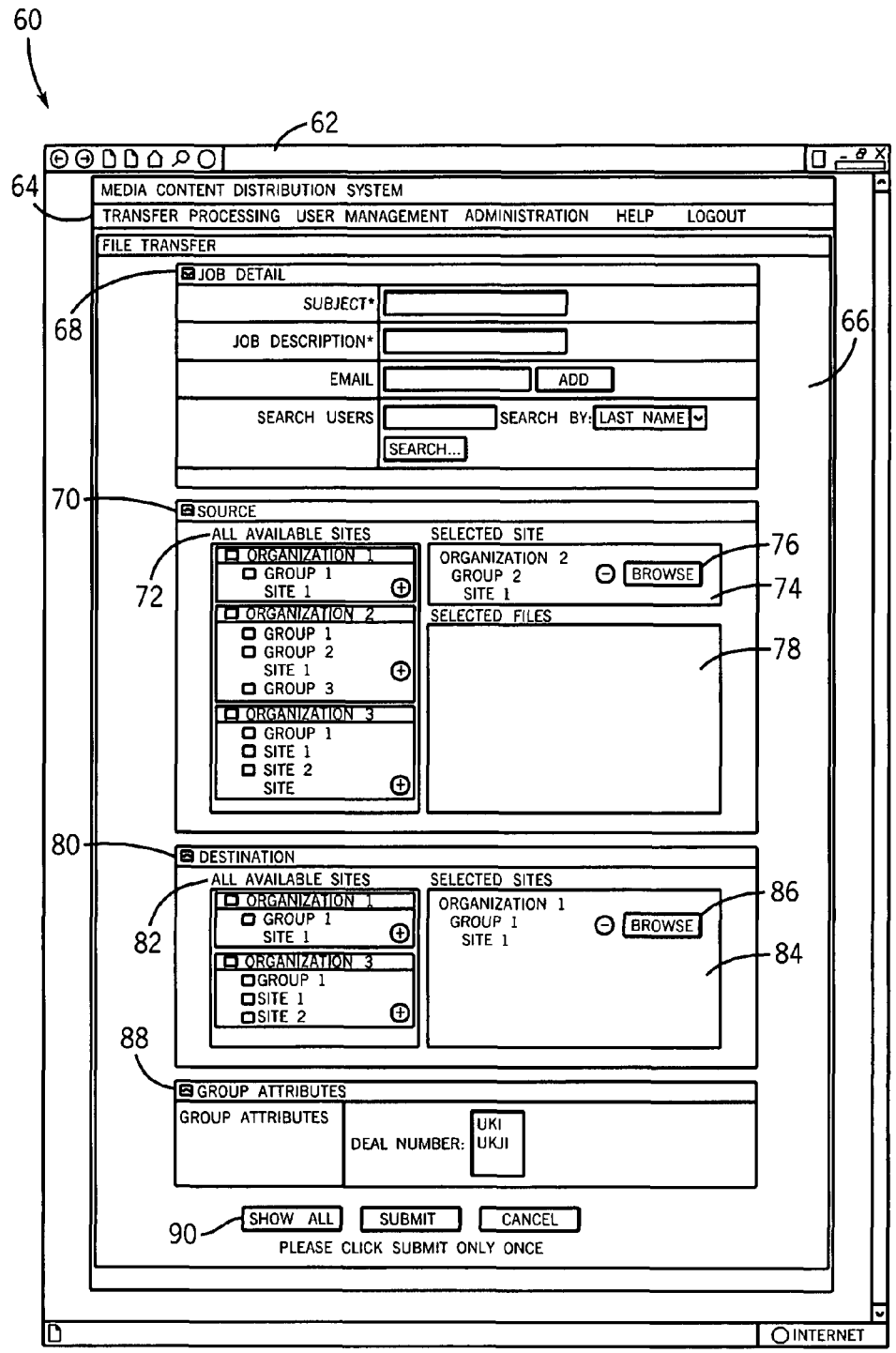
FIG. 4 is a diagrammatical representation of a file transfer screen of a MCDS interface in accordance with aspects of the present invention.

FIG. 4 is an exemplary file transfer screen 60 of an interface of the media content distribution systems 10, 40, and 50. The file transfer screen 60 may be loaded in a browser 62 including a menu 64 and the file transfer information 66. The menu 64 may include items such as transfer processing, user management, administration, help, log out, and so on. A job detail section 68 of file transfer information 66 may include blank fields for subject, job description, email, user search, and so forth. The file transfer screen 60 may also include a source section 70 showing available source sites 72 and a selected source site 74. A hierarchy of organization, group, site, and so on, may be noted for the available source sites 72 and selected source site 74. File servers at the selected source site 74 may be browsed by clicking on browse button 76. Any browsed files subsequently selected will be listed as selected files 78. Destination section 80 of the file transfer screen 60 provides for available destination sites 82 and selected destination sites 84. As with source site, a browse button 86 may be provided to allow the user to browse a file server of a selected site for available folders. The file transfer screen 66 may include a group attribute section 88 and also additional buttons 90 for various features, such as submit and cancel.

Figure 5:
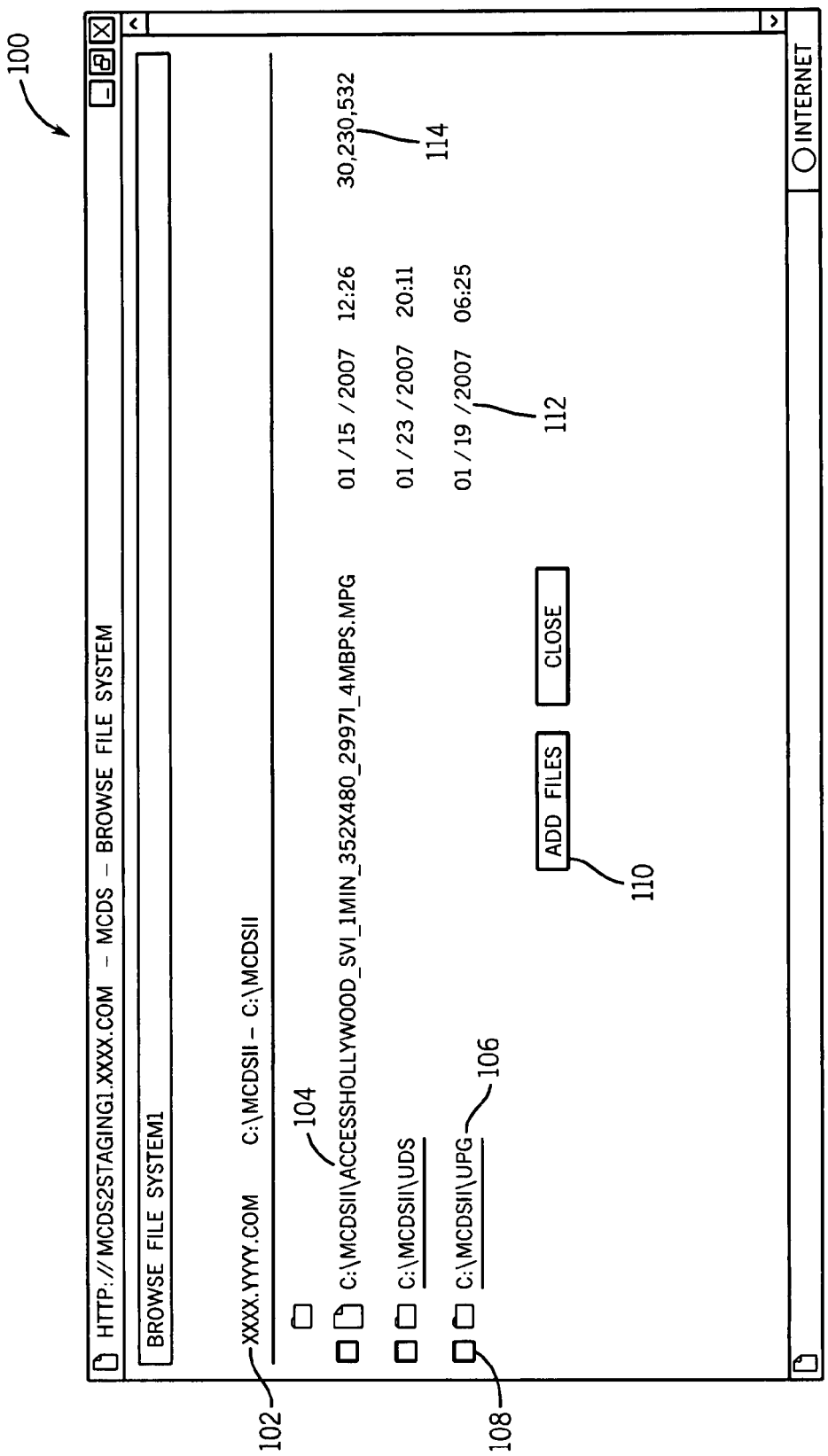
FIG. 5 is a diagrammatical representation of a browse screen of a MCDS interface in accordance with aspects of the present invention.

FIG. 5 depicts an exemplary pop-up screen 100 opened by clicking on the browse button 76 of FIG. 4. Such a browse pop-up screen 100 may also result from clicking on the browse button 86 of FIG. 4. The pop-up screen 100 notes the path 102 to the file server to be browsed is noted. Further, audio/video files 104 or subdirectories 106 containing audio/video files may be noted. Boxes 108 may be check to select source files or destination directories of a file server. A button 110 is clicked to add selected files. A modify date/time 112 is listed for each file 104 and subdirectory 106. Furthermore, the size 114 of a particular file (e.g., in bytes) is given.

Features of the present technique may include throughput based, site-level load balancing. In other words, the MCDS may allow for many agents to be registered with a specific site for the purpose of loadbalancing. The MCDS may load balance on all agents registered to a specific site based on the current throughput of each agent transferring the specific site's jobs. Moreover, the present technique may provide for custom XML File generation. Thus, the MCDS will allow the user to generate custom XML schemas and map attributes saved during MCDS transfers to XML elements all via an intuitive web based interface, for example. XML generation will be an option at run time and a generated xml document can be sent with the file.

Figure 6:
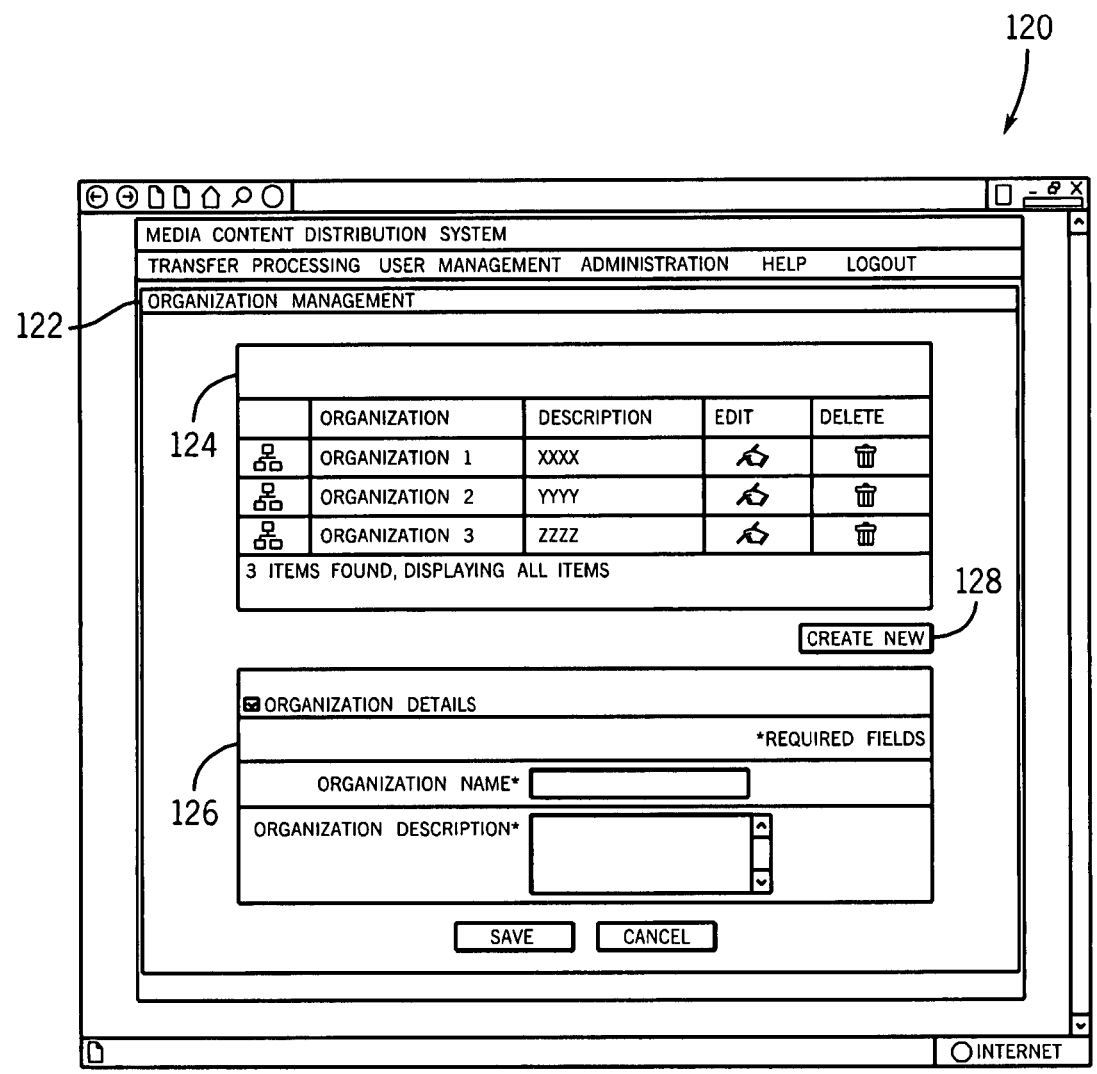
FIG. 6 is a diagrammatical representation of an organization management screen of a MCDS interface in accordance with aspects of the present invention.
Figure 7:
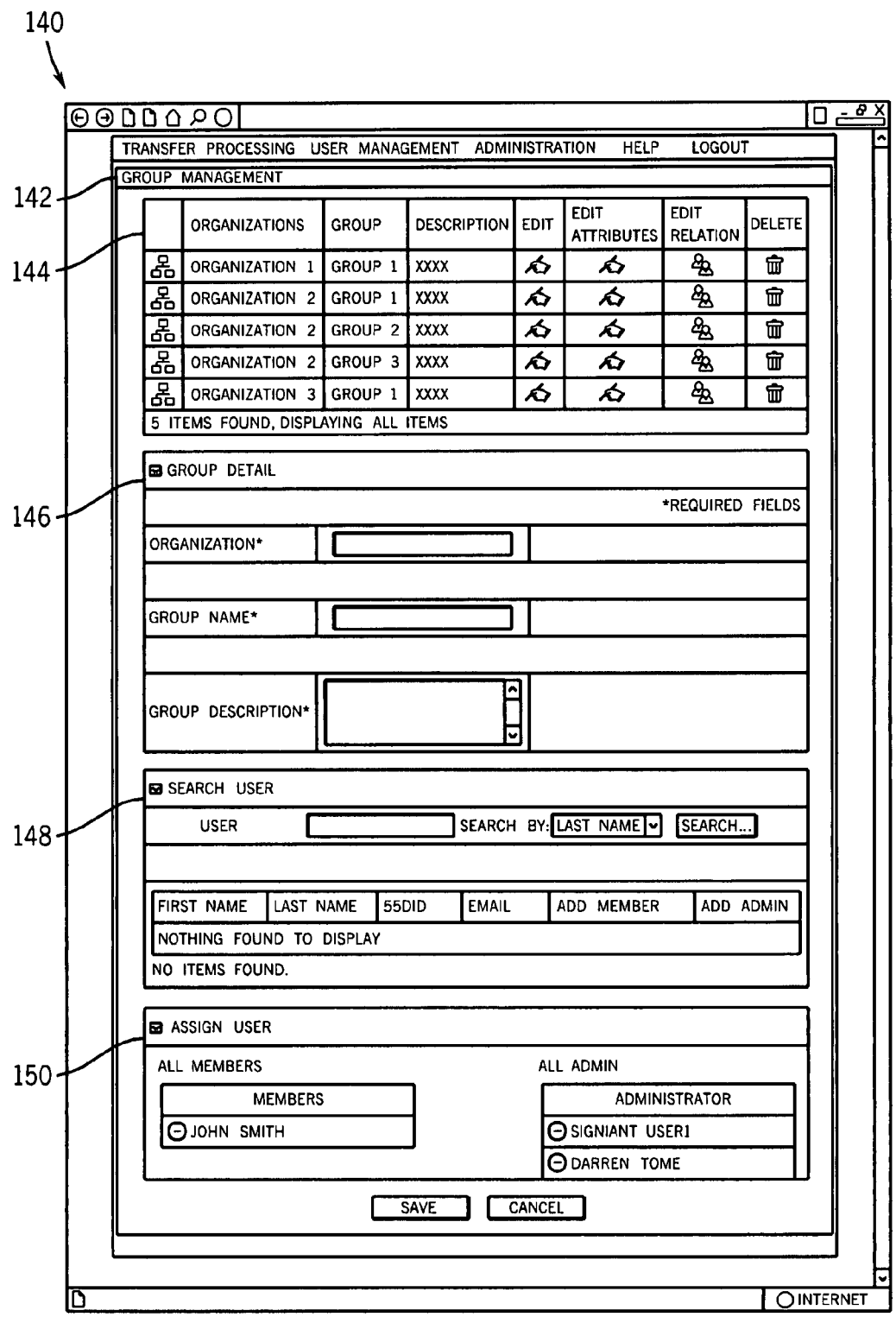
FIG. 7 is a diagrammatical representation of a group management screen of a MCDS interface in accordance with aspects of the present invention.

FIGS. 6-8 depict respectively an organization management screen 120, a group management screen 140, and a site management screen 160, each of an exemplary interface of a MCDS. In FIG. 6, organization management information 122 includes an editing section 124 having edit and delete icons for editing and deleting information associated with the created organizations. A brief description of the listed organizations is also given. In this example, an organization listing may be created by clicking on a create new button 126. Organization details section 126 provides blank fields for the name and description of the created organization or existing organization.

The group management information 142 of group management screen 140 includes a section 144 that facilitates the editing of group attributes and relations, group descriptive information, as well as deletion of existing groups. In this example, the names and description of the groups and associated organization are given. Additional sections include a group detail section 146, a search user section 148, and an assigned user section 150. In the group detail section 146, blank fields are provided for organization, group name, and group description. In the search user section 148, group users may be searched and group members added. Further, as indicated, administrators may be added. Lastly, the assign users section 150 presents the members and administrators assigned to a selected group.

FIG. 8 depicts site management information 162 of site management screen 160 having an available site section 163, edit site section 164, and group section 168. The available site section 163 lists the available sites. Site information may be edited, and the site may be deleted. A button 166 is provided for creating new site. In creating or editing a selected site, blank fields are provided for entering new or revised information. Further, an organization or group to associate with a given site may be listed or selected (e.g., in a pull down menu). Additional site information related to the address or location, allowable band width, minimum band width, connection speed, organization type (i.e. whether internal or external relative to the entity providing the application), and so forth, may be entered in blank fields or selected in pull down menus, and so on. The path for the associated group may be provided in group section 168. For example, the path type may be selected, in this illustrated embodiment, via a pull down menu. Moreover, the particular path for the group may be edited or removed. Further, site owners or users may be searched for (e.g., by last name). Such a search may be initiated in this example by clicking on search button 176. Available agents section 170 is provided to note what agents are available and registered for a selected site. Such agents may be assigned to the particular site being edited, for example. Moreover, site information may be saved by selecting save button 172.

In general, the present techniques may include providing a listing of content sources and content destinations, receiving a user selection of a content source and a content destination from the source and destination listing, and providing a listing of available routing paths for the exchange of digital content between the source and destination. The technique further provides receiving a user selection of a routing path from the routing path listing, and permitting transmission of the content from the selected source to the selected destination via the selected routing path. The listings are provided by a content exchange control entity, and the routing paths are internal to the content exchange control entity, or the routing paths may be external to the content exchange control entity.

The listing of content sources and content destinations, and the listing of available routing paths for the exchange of digital content may be provided in a graphical user interface. A load sharing or load balancing listing of a plurality of paths through which the digital content may be routed may be provided. The load sharing or balancing may permit the digital content to be transmitted through a plurality of paths, or agents related to a specific site, as optimized or determined by MCDS. Such agents may be listed on an interface screen for site management, for example. The technique may include a plurality of bandwidth selections permitting a user to select a bandwidth for transmission of particular digital content from a particular source to a particular destination. A browse path on a source server that is available for browsing may be configured to be unavailable to certain destinations, if such a restriction is desired. In general, the present technique may provide for an interface for controlling transfer of digital content. The interface may include a listing of content sources and content destinations, the source and destination listing permitting user selection of content source and content destinations for transfer of digital content. In certain embodiments, the MCDS facilitates transfer from a single source to multiple destinations. The interface may also include a listing of available routing paths for the exchange of digital content between the source and destination. The routing path listing permits user selection of a routing path for the transfer of the content from the selected source to the selected destination.

Figure 9:
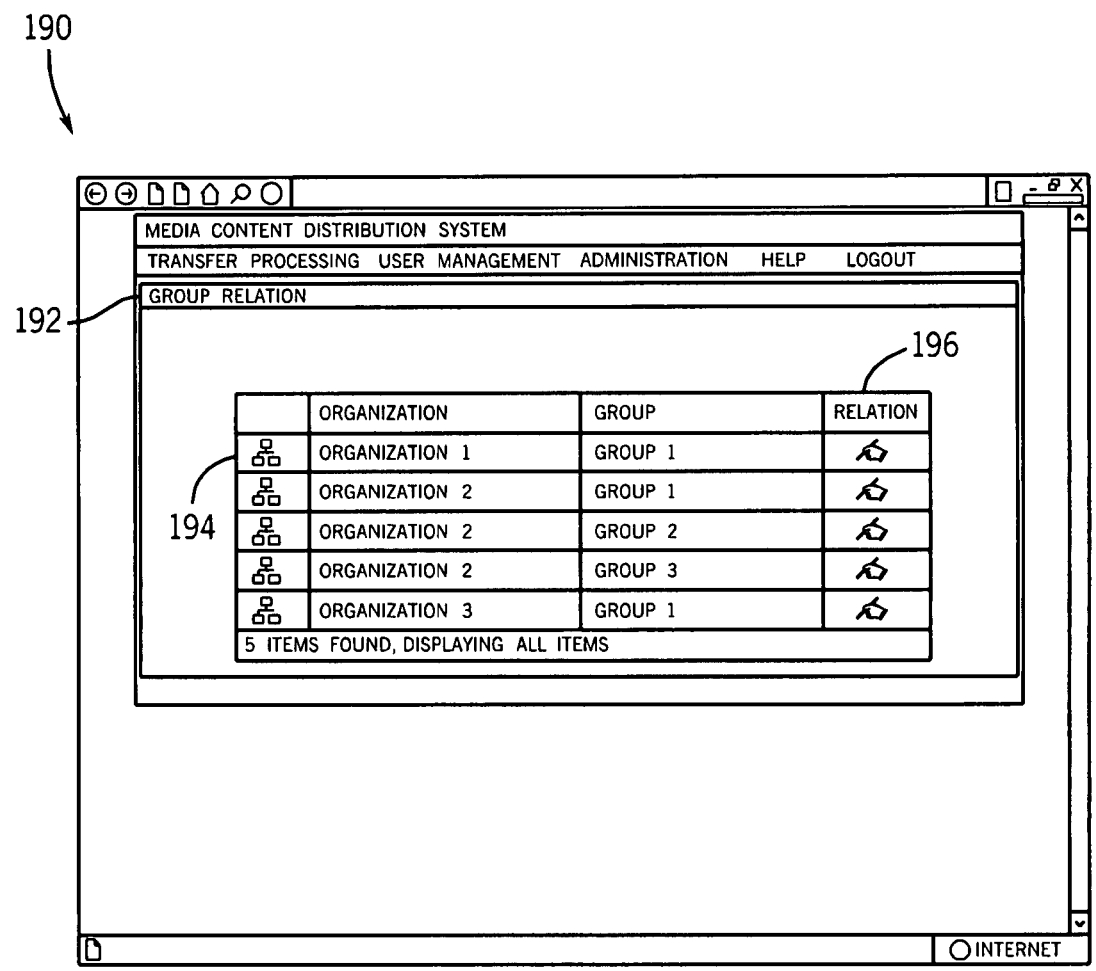
FIG. 9 is a diagrammatical representation of a group relation screen of a MCDS interface in accordance with aspects of the present invention.
Figure 10:
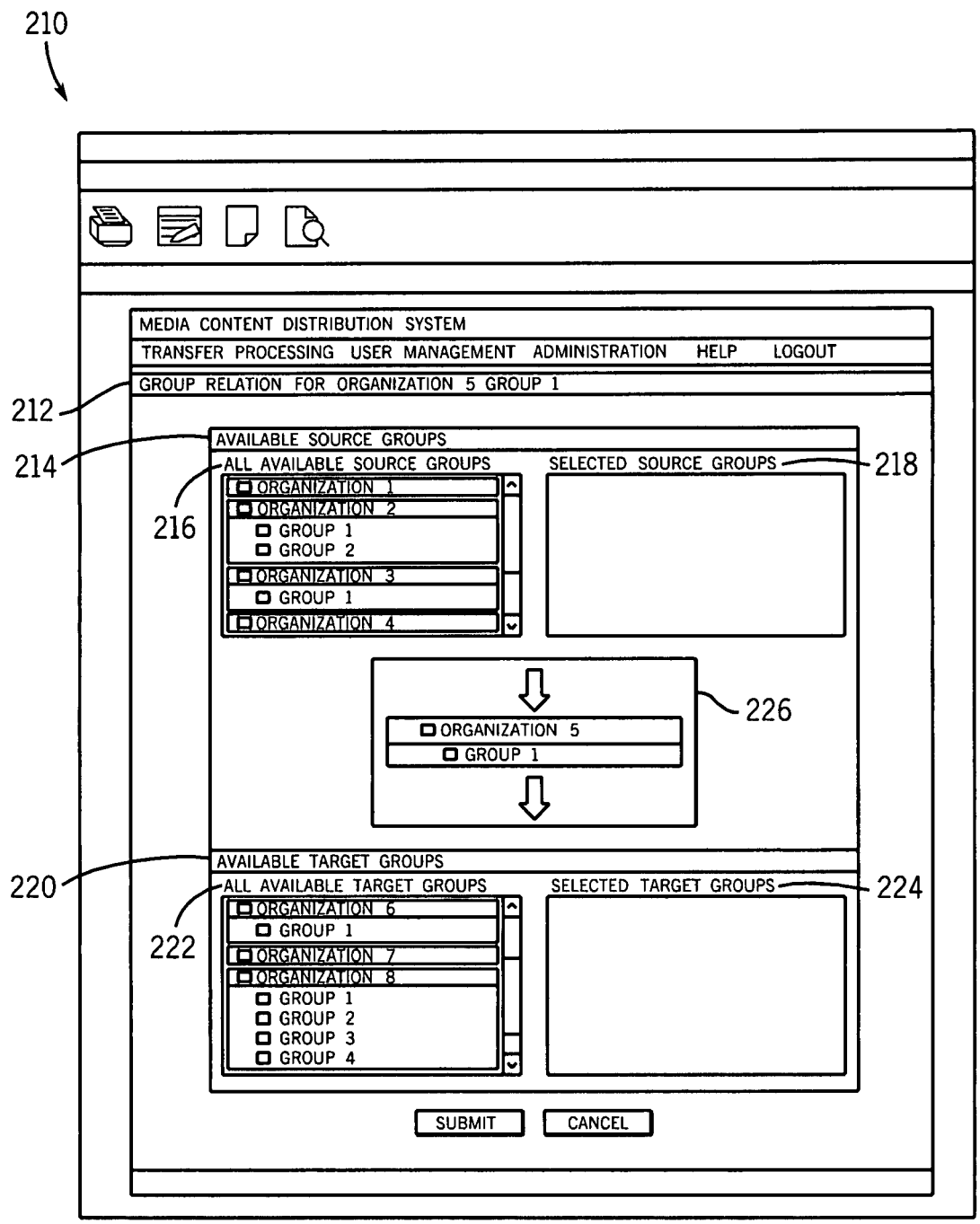
FIG. 10 is a diagrammatical representation of a group relation screen of a MCDS interface in accordance with aspects of the present invention.

FIG. 9 depicts group screen 190 and FIG. 10 depicts group screen 210, each available for managing and editing group relations associated with media content distribution systems 10, 40, and 50. In FIG. 9, a group relation section 192 with details 194 of organization, group, and selectable relation 196 is provided. In FIG. 10, a group relation 212 or a particular selected group (group 5 in this example), is provided. An available source group section 214 with available source groups 216 is depicted. Selected source groups 218 may also be listed. Further, available target groups section 220 having available target groups 222 and selected target groups 224 is provided. In both sections 214 and 220, sites associated with each respective group may be noted. Lastly, section 226 denotes the selected group (again, in this example group 5), and the relationship between the available source groups 216 and available target groups 222.

Figure 11:
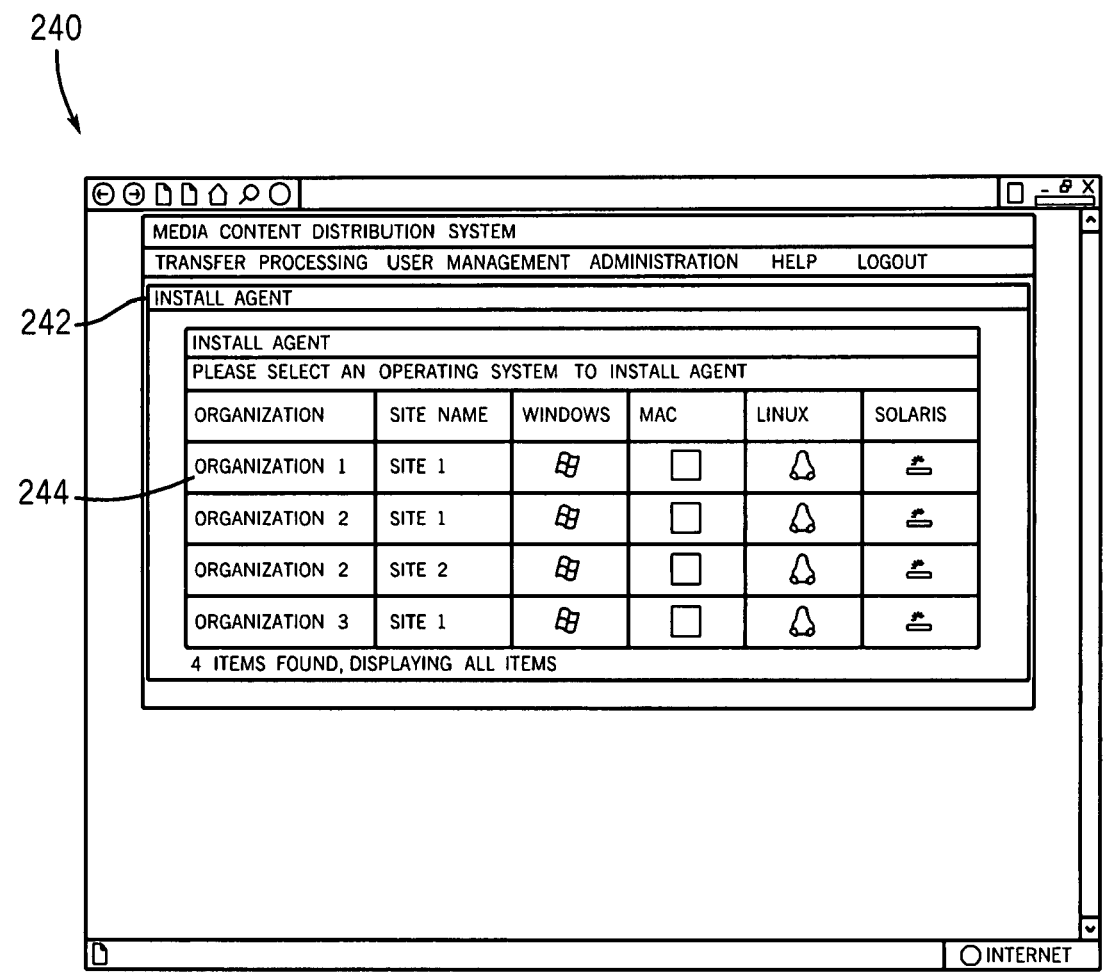
FIG. 11 is a diagrammatical representation of an install agent screen of a MCDS interface in accordance with aspects of the present invention.
Figure 12:
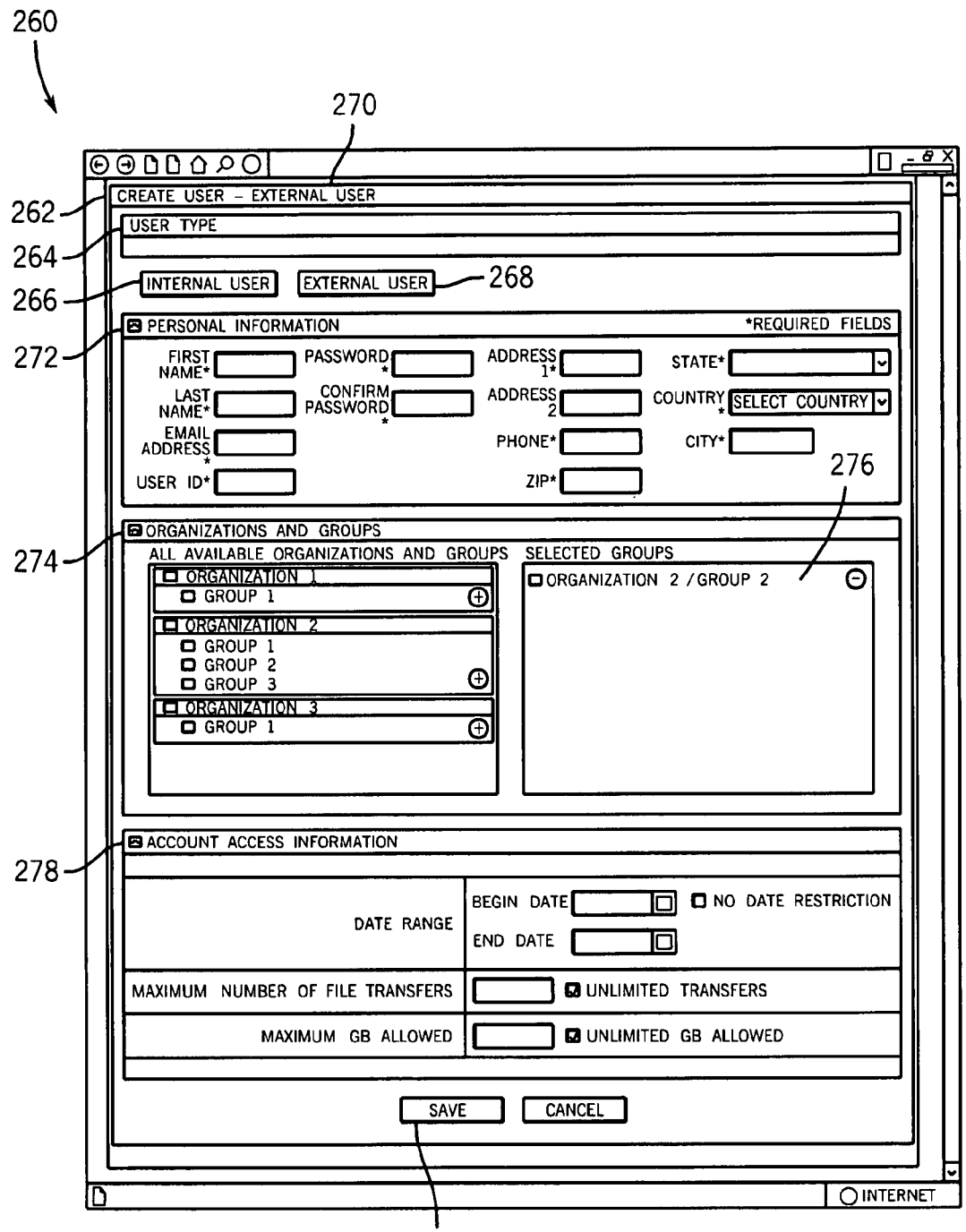
FIG. 12 is a diagrammatical representation of a create user screen of a MCDS interface in accordance with aspects of the present invention.

FIGS. 11 and 12 depict an install agent screen 240 and a create user screen 260, respectively. In FIG. 11, the install agent section 242 includes a subsection 244 which provides the organization name, site name, and associated operating system. A user (e.g., an administrator of a MCDS 10, 40, and/or 50) can install an agent to a MCDS via install agent screen 240. In FIG. 12, the create user screen 260 is depicted for creating an external user. However, it should be noted that an internal user (i.e., internal with the application provider) may also be created via a similar type of screen 260. In the illustrated embodiment, the create user section 262 presents the user type 264 (i.e., internal user or external user), and provides buttons 266 and 268 for selecting the user type 264. The create user section 262 also has a personal information section 272 and associated organization/group section 274 are given. Selected groups 276 for the user being created are assigned and noted. Lastly, an account access information section 278 presents blank fields and/or pull down menus for beginning and end dates, maximum number of file transfers, maximum size in gigabytes allowed, and so forth. A save button 280 may be clicked to save the updated user information.

Figure 13:
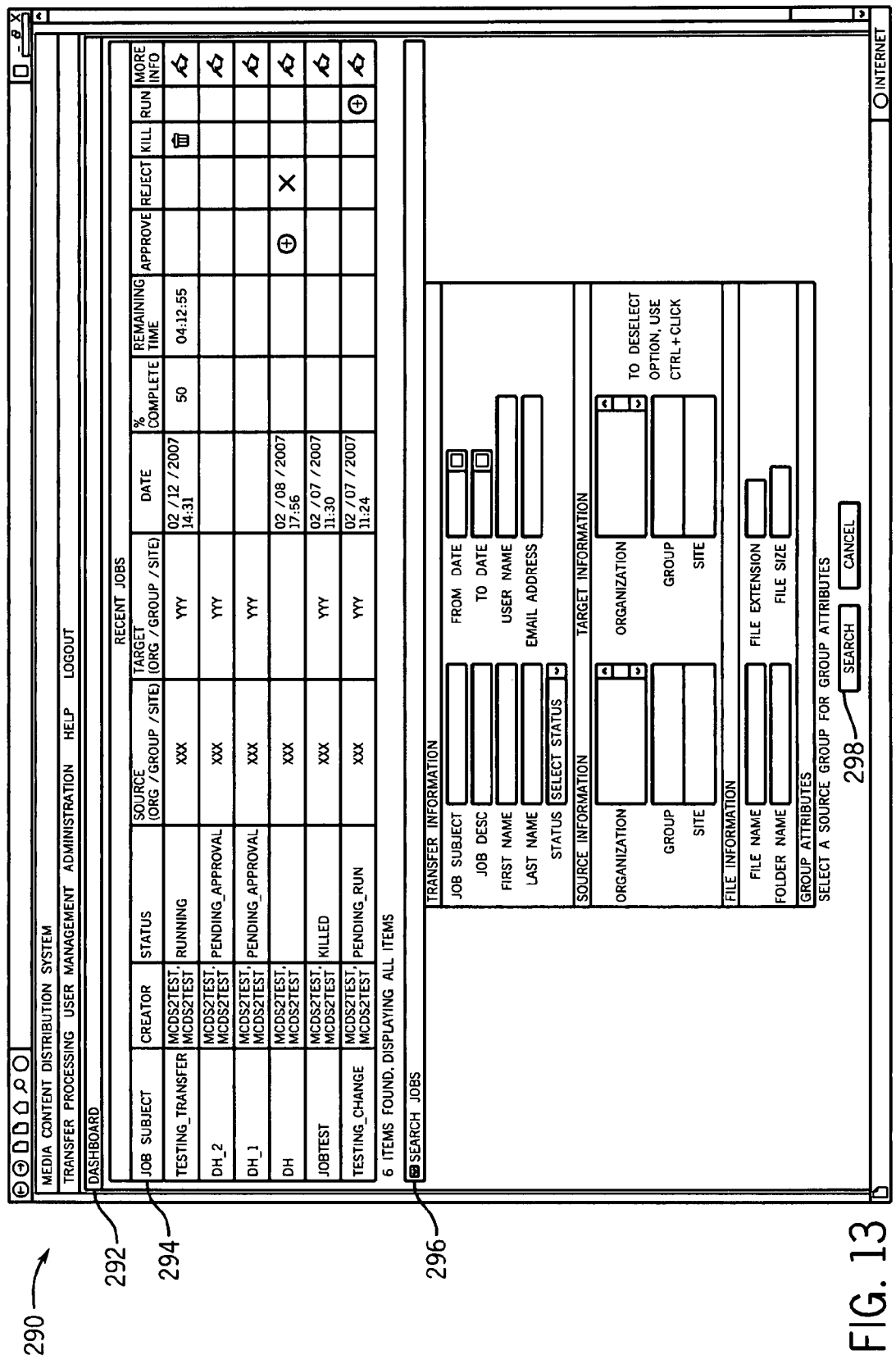
FIG. 13 is a diagrammatical representation of a dashboard screen of a MCDS interface in accordance with aspects of the present invention.

FIG. 13 provides a dashboard screen 290 having a dashboard 292 which presents recent jobs information 294 and search jobs information 296. The recent jobs information 294 includes the job subject, creator, status, source, target, (destination), date, percent complete, and remaining time. In addition, approve/reject and kill options are provided. A more info icon may be clicked to view additional information. The search jobs section 296 notes transfer information, source information, file information, and group attributes. Lastly, a search-button 298 is provided to search for file transfer jobs. In general, the dashboard 292 may provide a main report of a MCDS. In certain embodiments, the dashboard is the first page that a user is presented.

An additional feature of the present technique includes site bandwidth throttling. In other words, an admin user of the MCDS may adjust bandwidth settings at the site level on the fly (e.g., change site bandwidth from 10 Mbps to 1000 Mbps). In response, the MCDS automatically adjusts bandwidth settings proportionally for all jobs that are running to and from that site. If the bandwidth settings are changed such that jobs must be paused in order for the bandwidth restrictions to be met, the MCDS will automatically select or allow the user to pick which job to pause.

Another feature of the MCDS includes weighted job prioritization at the site level, which allows a user to adjust a weighted priority on the file-transfer jobs that the user has rights. For example, if a user has three jobs, the user can weight one of the jobs (i.e., the most important job) higher than the other two jobs. In response, the MCDS will increase bandwidth on the more important job and lower the bandwidth setting on the other two jobs. If a user is an administrator of the MCDS transfer site, the administrator may prioritize all jobs going to and from their site in certain embodiments.

Furthermore, the present technique may include a self-service business rule creation for transfer approvals. This is in contrast to other embodiments of the present technique where the MCDS requires an approval of the control entity of a file transfer from an external client to an external client. Self-service business rule creation allows the MCDS to automatically approve different types of jobs (i.e., internal to external, external to internal, internal to internal, external to external) based on meeting pre-defined criteria. This criteria may include source, destination, file type, file size, total file size, attribute metadata, transfer type (UDP, TCP, FTP, HTTP), and so on.

Yet another feature of the MCDS may include an automated low-resolution proxy generation for media content. As a selectable feature, for example, the MCDS will offer low-resolution proxy generation for all media content on a content location to allow users to preview what they are including in their transfer. In this example, the preview is available during file browsing. The proxies are stored at the client location and typically not kept on the control entity's (application provider's) storage network.

Lastly, another feature of the MCDS may include a universal transfer adapter. A problem with transfer technology and transfer management is the high number of available transfer methods and proprietary transfer software packages that are used today. In order to connect to a client using a particular software, you typically should have that particular software and generally cannot transfer if you do not have that particular software. Protocols such TCP, FTP, HTTP, and UDP generally serve as the normal method of transfers, but software that is commonly wrapped around the protocols and do interact with each other. The universal transfer adapter in MCDS will allow communication between any proprietary software client over any transfer protocol. For example, if we were using transfer software X, and trying to connect to transfer software Y on the external client side, MCDS would transfer content:

```
Internal Agent (Software X) ->Internal Relay Agent (Software X) ->
DMZ Relay Agent (Transfer Adapater: Software X->Software Y)->
External Agent(Software Y);
or
External Agent (Software Y)-> DMZ Relay Agent (Transfer Adapater:
Software Y->Software X) -> Internal Relay Agent (Software X) ->
Internal Agent(Software X).
```

The MCDS may also connect to a client that using FTP (or any protocol) as a destination from a source that is using a proprietary software. The FTP may interchangeable with most or any transfer protocol. Software X,Y uses as examples may be is interchangeable with most or any transfer software, which includes but is not limited to Signiant, Aspera, Copper, SmartJog, DigiDelivery, DG Systems, etc. The MCDS would transfer the content:

```
Internal Agent (Software X) ->Internal Relay Agent (Software X) ->
DMZ Relay Agent (Transfer Adapater: Software X->FTP)->
FTP Folder(FTP);
or
FTP Folder (FTP)-> DMZ Relay Agent (Transfer Adapater: FTP->
Software X) -> Internal Relay Agent (Software X) -> Internal
Agent(Software X).
```

In certain embodiments, the MCDS uses an intuitive, web-based interface to enable a user to initiate, monitor, and control file transfers to and from a designated location. In some examples, the present technique provides hardware and software to: (a) maintain a list of approved senders entitled to initiate transfers; (b) maintain a list of approved recipients specific to each approved sender; (c) give an administrator the ability to define custom required or non-required metadata fields to be filled out by the user at the time of file transfer; (d) maintain records of the path to a designated content store (networked or local disk) specific to the sender/receiver and physical location (transfer site) combination; (e) maintain records and operational status of all transfer agents that are available to a physical location (transfer site); (f) provide load-balancing of transfer jobs among a specific group of transfer agents that belong to a specific physical location (transfer site); (g) provide control to administrator of the transfer group via a transfer job approval workflow when a transfer is initiated between two third party clients external to the control entity or application provider); (h) provide a dashboard that enables approval, monitoring and modification of pending and in-progress transfer jobs; (i) maintain bandwidth restrictions for the physical location (transfer site) to ensure that the sum of the transfer jobs do not overrun the allocated bandwidth given to MCDS; (j) automatically queue jobs that exceed bandwidth restrictions; (k) maintain records of all transfers initiated through the system; and (l) output commands to the secure transport software or transfer manager (e.g., Signiant) to control file transfers according to requirements and parameters set by the user. The MCDS may be a user-friendly system that manages or controls file transfers (e.g., large media files or small text files), providing more than basic file transfer technology.

While only certain features of the invention have been illustrated and described herein, many modifications and changes will occur to those skilled in the art. It is, therefore, to be understood that the appended claims are intended to cover all such modifications and changes as fall within the true' spirit of the invention.

The invention claimed is:

1. A method for transfer of digital content comprising:
providing from a content exchange control entity computer a listing of content sources and content destinations to a content source or content destination computer;
receiving on the content exchange control entity computer from the content source or content destination computer a user selection of a content source and a content destination from the source and destination listing;
providing from the content exchange control entity computer to the content source or content destination computer a listing of available routing paths for the exchange of digital content between the source and destination;
receiving on the content exchange control entity computer from the content source or content destination computer a user selection of a routing path from the routing path listing; and
permitting transmission of the content from the selected source to the selected destination via the selected routing path.

2. The method of claim 1, wherein the routing paths are internal to the content exchange control entity.

3. The method of claim 1, wherein the routing paths are external to the content exchange control entity.

4. The method of claim 1, wherein the listing of content sources and content destinations, and the listing of available routing paths for the exchange of digital content between the source are provided in a graphical user interface.

5. The method of claim 1, further comprising providing a load balancing listing of a plurality of paths through which the digital content may be routed, the load balancing listing permitting the digital content to be transmitted through a plurality paths selectable by a user.

6. The method of claim 5, comprising receiving a user selection of paths through which the digital content may be routed for load balancing.

7. The method of claim 1, comprising providing a plurality of bandwidth selections permitting a user to select a bandwidth for transmission of particular digital content from a particular source to a particular destination.

8. The method of claim 1, comprising automatically load balancing transmissions of the content.

9. A method for transfer of digital content comprising:
receiving on the content exchange control entity computer from the content source or content destination computer a user selection of a content source and a content destination from a source and destination listing;

receiving on the content exchange control entity computer from the content source or content destination computer a user selection of a routing path from a listing of available routing paths for the exchange of digital content between the source and destination provided by a content exchange control entity; and permitting transmission of the content from the selected source to the selected destination via the selected routing path, wherein the selected source and the selected destination are external to the content exchange control entity.

10. The method of claim 9, wherein the routing paths are internal to the content exchange control entity.

11. The method of claim 9, wherein the routing paths are external to the content exchange control entity.

12. The method of claim 9, wherein the listing of content sources and content destinations, and the listing of available routing paths for the exchange of digital content between the source are provided in a graphical user interface.

13. The method of claim 9, comprising receiving a user selection of a plurality of paths through which the digital content may be routed for load balancing.

14. The method of claim 9, comprising receiving a user selection of one of a plurality of bandwidth selections for transmission of particular digital content from a particular source to a particular destination.

15. A system for transfer of digital content comprising:
means for providing from a content exchange control entity computer a listing of content sources and content destinations to a content source or content destination computer;

means for receiving on the content exchange control entity computer from the content source or content destination computer a user selection of a content source and a content destination from the source and destination listing;

means for providing from the content exchange control entity computer to the content source or content destination computer a listing of available routing paths for the exchange of digital content between the source and destination;

means for receiving on the content exchange control entity computer from the content source or content destination computer a user selection of a routing path from the routing path listing; and means for permitting transmission of the content from the selected source to the selected destination via the selected routing path.

16. The system of claim 15, wherein the routing paths are internal to the content exchange control entity.

17. The system of claim 15, wherein the routing paths are external to the content exchange control entity.

18. A method for transfer of digital content comprising:
providing from a content exchange control entity computer a listing of content sources and content destinations to a content source or content destination computer;

receiving on the content exchange control entity computer from the content source or content destination computer a user selection of a content source and a content destination from the source and destination listing;

providing from the content exchange control entity computer to the content source or content destination computer a listing of available routing paths for the exchange of digital content between the source and destination;

receiving on the content exchange control entity computer from the content source or content destination computer a user selection of a routing path from the routing path listing;

permitting transmission of the content from the selected source to the selected destination via the selected routing path; and comprising automatically load balancing transmissions of the content.

19. The method of claim 18, wherein the routing paths are internal to the content exchange control entity.

20. The method of claim 18, wherein the routing paths are external to the content exchange control entity.

21. The method of claim 18, further comprising providing a load balancing listing of a plurality of paths through which the digital content may be routed, the load balancing listing permitting the digital content to be transmitted through a plurality paths selectable by a user.

* * * * *